(12) United States Patent
Bednarik et al.

(10) Patent No.: US 7,270,876 B2
(45) Date of Patent: Sep. 18, 2007

(54) ENHANCED ADHESION OF POLYETHYLENE TEREPHTHALATE TO PAPERBOARD

(75) Inventors: Ladislav Bednarik, Loveland, OH (US); Vivek Rohatgi, Owasso, OK (US); David V. Reed, Blanchester, OH (US)

(73) Assignee: International Paper Company, Memphis, TN (US)

( * ) Notice: Subject to any disclaimer, the term of this patent is extended or adjusted under 35 U.S.C. 154(b) by 65 days.

(21) Appl. No.: 10/722,951

(22) Filed: Nov. 26, 2003

(65) Prior Publication Data

US 2004/0161601 A1 Aug. 19, 2004

Related U.S. Application Data

(60) Provisional application No. 60/429,322, filed on Nov. 27, 2002.

(51) Int. Cl.
- B32B 27/10 (2006.01)
- B32B 27/16 (2006.01)
- B32B 27/30 (2006.01)
- B32B 27/36 (2006.01)
- B32B 37/15 (2006.01)

(52) U.S. Cl. ............... 428/341; 428/219; 428/340; 428/342; 428/480; 428/481; 428/483; 428/507; 428/511; 428/512; 428/513; 428/514; 428/537.5; 428/537.7; 427/223; 427/299; 427/322; 427/324; 427/326; 427/402; 427/407.1; 427/411

(58) Field of Classification Search ............... None
See application file for complete search history.

(56) References Cited

U.S. PATENT DOCUMENTS

| | | | | |
|---|---|---|---|---|
| 4,044,197 A | * | 8/1977 | Wiest et al. .......... 526/304 |
| 4,147,836 A | * | 4/1979 | Middleton et al. .......... 428/481 |
| 4,455,184 A | * | 6/1984 | Thompson .......... 156/244.11 |
| 4,543,280 A | * | 9/1985 | Fujita et al. .......... 206/524.3 |
| 4,737,548 A | * | 4/1988 | Kojima et al. .......... 525/193 |
| 5,022,554 A | * | 6/1991 | Heeter et al. .......... 220/574 |
| 5,178,960 A | * | 1/1993 | Cook .......... 428/461 |
| 5,360,663 A | * | 11/1994 | Moteki et al. .......... 442/62 |
| 5,935,664 A | | 8/1999 | Claytor et al. |
| 5,942,295 A | * | 8/1999 | Adur et al. .......... 428/34.2 |
| 5,968,647 A | | 10/1999 | Adur et al. |
| 6,030,477 A | | 2/2000 | Olvey |
| 6,068,897 A | | 5/2000 | Adur et al. |
| 6,074,733 A | | 6/2000 | Falat |
| 6,132,886 A | * | 10/2000 | Share .......... 428/500 |
| 6,358,576 B1 | * | 3/2002 | Adur et al. .......... 428/34.2 |
| 6,540,862 B1 | * | 4/2003 | Calvert et al. .......... 156/244.17 |
| 6,544,722 B2 | * | 4/2003 | Bouwstra et al. .......... 430/349 |
| 6,645,584 B1 | * | 11/2003 | Kuusipalo et al. .......... 428/34.2 |
| 6,762,239 B1 | * | 7/2004 | Williams .......... 524/547 |
| 6,787,205 B1 | * | 9/2004 | Aho et al. .......... 428/34.2 |
| 6,903,161 B2 | * | 6/2005 | Morris .......... 525/191 |
| 2001/0024730 A1 | * | 9/2001 | Broce et al. .......... 428/481 |

FOREIGN PATENT DOCUMENTS

EP 421103 A * 4/1991
JP 10-151655 * 6/1998

* cited by examiner

*Primary Examiner*—Vivian Chen
(74) *Attorney, Agent, or Firm*—Thomas W. Barnes, III; Matthew M. Eslami; Kenneth R. Schaefer

(57) ABSTRACT

A unique primer emulsion chemistry yields excellent adhesion of polyethylene terephthalate (PET)resin to clay coated paperboard (with high starch content)at reduced coatweights of the primer emulsion and the resin as compared to other primer and tie-resin chemistries currently employed for moisture barrier applications. A primer used for adhesion enhancement is an ammonium catalyzed, self-crosslinking copolymer of ethylene-vinyl acetate with N-methylol acryl amide functional groups attached to a polymer backbone. Use of the primer in amounts up to about 0.5 pounds per ream permits PET coatweights of as low as 10–12 lbs per ream and lower for some applications.

15 Claims, No Drawings

ENHANCED ADHESION OF POLYETHYLENE TEREPHTHALATE TO PAPERBOARD

This application claims the benefit of U.S. Provisional Patent Application No. 60/429,322, filed Nov. 27, 2002, the disclosure of which is hereby incorporated herein by reference.

BACKGROUND OF THE INVENTION

This invention is directed to providing enhanced adhesion of polyethylene terephthalate (PET) resin to paperboard substrates to facilitate use of lower coatweights of the resin for providing a moisture barrier.

Currently, extrusion coatweights of 28 to 32 pounds per ream of polyethylene terephthalate resin are applied to bleached board grades for dual ovenable tray applications such as in connection with frozen food containers. In addition to higher manufacturing costs, heavy coatweights result in issues with die cutting and product formability. There is therefore a need to develop processes and/or materials to be able to lower the coatweight of extruded polyethylene terephthalate film while retaining its high adhesion to paperboard to fit the end-use performance requirements.

It is an advantage of this invention to provide a primer allowing lower polyester coatweights on paperboard.

It is another advantage of the invention to provide PET coated paperboard having improved die cutting and formability characteristics.

It is still another advantage of the invention to provide a primer for improved adhesion enhancement of PET to the felt side of clay coated paperboard.

These other advantages of the invention will be apparent to one of ordinary skill in the art after reading the following description of the invention.

SUMMARY OF THE INVENTION

The present invention relates to a primer emulsion chemistry yielding excellent adhesion of polyethylene terephthalate resin to clay coated paperboard (with relatively high starch content) at much reduced coatweights of the resin. The primer used for adhesion enhancement is an ammonium chloride catalyzed, self-crosslinking copolymer of ethylene-vinyl acetate with N-methylol acryl amide functional groups attached to a polymer backbone. The use of the primer facilitates use of PET coatweights of as low as about 10–12 pounds per ream (and lower for some applications).

DETAILED DESCRIPTION OF THE INVENTION

The invention enables the use of lower coatweights for adhesion to dual ovenable trays and the like and thereby lowers costs for a product that converts easily on existing equipment.

The invention makes use of a primer emulsion for adhering coatweights of polyethylene terephthalate as low as about 12 pounds per ream to clay coated board with high starch, (basis weight of 199 lbs/ream) and coatweights of as low as about 10 pounds per ream of polyethylene terephthalate for non-clay-coated board with a basis weight of 282 lbs/ream. The adhesive primer has a dry weight of up to about 0.5 pounds per ream.

The end product exhibited adhesion measured with 180° peel strength over 600 grams per inch (g/in) under TAPPI conditions and over 800 g/in at high temperature and humidity. This was an unexpected result when using an adhesive primer in such low quantities, especially for clay coated board with a starch content ranging from 25–40 pounds per ton which interferes with polyethylene terephthalate adhesion to the board substrate.

This discovery enables a blister free product when an empty converted tray is subjected to high temperatures at 400° F.–420° F. for up to half an hour and for a food filled tray for up to one hour in a convection oven or on high power for five minutes in a microwave oven.

Extrudable coated paperboard for dual ovenable tray applications can be produced with a low coatweight extruded polyester coating. The extrusion is conducted using an Er-WE-Pa extrusion line at a speed ranging, for example, between about 800 and 1200 feet per minute over primed paperboard with and without the use of a flame treater.

A preferred primer used for adhesion enhancement is an ammonium chloride catalyzed, self-crosslinking copolymer of ethylene-vinyl acetate with N-methylol acryl amide functional groups attached to a polymer backbone. The primer is applied in line with extrusion at coatweights of as low as 0.1–0.5 pounds per ream. Functional structures with polyethylene terephthalate resin coatweights ranging from 12 to 18 lbs/ream can be obtained. Polyethylene terephthalate with coatweights lower than 10 lbs/ream can be used to adhere to paper with priming. In certain applications, these coatweights may be too low, but they can be obtained with the unique primer formulation for applications such as non clay coated board. Misting and flame treatment optionally can be used with the primer. Optionally, misting with water is applied to the board prior to primer application in line with the extrusion process at the rate of 0.01 to 0.1 lbs/ream without sacrificing adhesion. The primer preferably is applied by gravure cylinder followed up by hot air drying.

A variation of the invention comprises using a polyethylene terephthalate coextrusion with epoxy modified polyolefin tie resins. Other variations and modifications will be obvious to one of ordinary skill in the art without departing from the scope of the invention. The invention encompasses such variations and modifications.

The invention claimed is:

1. A package material comprising
   a paperboard substrate,
   a primer applied to said substrate, wherein the primer is ammoniuxn catalyzed, self-cross linking copolymer of ethylene-vinyl acetate with N-methylol acxyl amide functional groups attached to a polymer backbone wherein said primer has a coat weight of 0.1–0.5 lbs./ream,
   a polyester coating applied to said primed substrate, said coating having a coat weight of at least 12 lbs./ream.

2. The packaging material of claim 1 wherein said coating is polyethylene terephthalate.

3. The packaging material of claim 1, wherein said paperboard substrate is clay coated.

4. The packaging material of claim 1, wherein said paperboard substrate is clay coated and said polyester coating comprises polyethylene terephthalate.

5. The method of forming a packaging material comprising providing a paperboard substrate,
   applying a primer to said substrate, and
   applying a polyester coating to said primed substrate with a coat weight of up to 12 lbs/ream,
   wherein said polyester coating is extruded onto said substrate at a line speed of 800–1200 feet per minute.

6. The method of claim 5, wherein said coating is polyethylene terephthalate.

7. The method of claim 5, wherein said primer is an ammonium catalyzed, self- cross linking copolymer of ethylene-vinyl acetate with N-methylol acryl amide functional group attached to a polymer backbone.

8. The method of claim 5 further comprising flame treating said substrate.

9. The method of claim 5 further comprising water misting said substrate.

10. The method of claim 9 wherein water is misted at 0.01 to 0.1 lbs/ream.

11. The method of claim 5 further comprising a clay coating on said substrate.

12. The method of claim 5 wherein said polyester coating has a coat weight of 10 lbs/ream.

13. The method of claim 5 wherein said coat weight is 10 lbs/ream.

14. The method of claim 4 wherein said primer is epoxy modified polyolefin tie resins.

15. The method of claim 5, further comprising coating said paperboard substrate with a clay coating and wherein said polyester coating comprises polyethylene terephthalate.

* * * * *